United States Patent [19]

Matsunuma

[11] Patent Number: 4,518,024

[45] Date of Patent: May 21, 1985

[54] PNEUMATIC RADIAL TIRE HAVING AN IMPROVED DURABILITY IN THE RUNNING ON BAD ROAD

[75] Inventor: Tamotsu Matsunuma, Higashimurayama, Japan

[73] Assignee: Bridgestone Tire Company Limited, Japan

[21] Appl. No.: 577,921

[22] Filed: Feb. 7, 1984

[30] Foreign Application Priority Data

Apr. 27, 1983 [JP] Japan .................................. 58-73058

[51] Int. Cl.³ .............................................. B60C 9/20
[52] U.S. Cl. ........................ 152/361 DM; 152/361 R
[58] Field of Search ...... 152/361 R, 361 FP, 361 DM

[56] References Cited

U.S. PATENT DOCUMENTS

| | | | |
|---|---|---|---|
| 2,930,426 | 3/1960 | Klang et al. | 152/361 R |
| 3,625,272 | 12/1971 | Fletcher | 152/361 R |
| 4,235,274 | 11/1980 | Suzuki et al. | 152/361 DM |
| 4,310,043 | 1/1982 | Inoue | 152/361 R |

*Primary Examiner*—Lois E. Boland
*Attorney, Agent, or Firm*—Sughrue, Mion, Zinn, Macpeak and Seas

[57] ABSTRACT

A pneumatic radial tire having an improved durability in the running on bad road is disclosed, which comprises a carcass composed of at least one rubberized cord ply containing cords arranged substantially perpendicular to the equatorial plane of the tire and a belt superimposed around the crown portion of the carcass and composed of at least two rubberized cord layers each containing cords inclined at a relatively small angle with respect to the equatorial plane of the tire, the cords of which being crossed with each other. In this tire, the outermost layer of the belt contains cords having a flexural rigidity lower than that of the remaining layer and arranged at an end count higher than that thereof.

3 Claims, No Drawings

PNEUMATIC RADIAL TIRE HAVING AN IMPROVED DURABILITY IN THE RUNNING ON BAD ROAD

BACKGROUND OF THE INVENTION (1) Field of the Invention

This invention relates to a pneumatic radial tire having an improved durability in the running on bad road surfaces.

(2) Description of the Prior Art

Radial tires, particularly heavy duty tires for trucks, buses and the like using steel cords as a reinforcement for the belt, carcass and the like are used not only on fully-paved and well-conditioned good roads, for instance, a route for the exclusive use of motor vehicles such as expressway or the like, but also on running roads partly including bad roads with an inferior road surface, such as a construction road or the like. Particularly, in the latter case, the tires are apt to have abnormal shortening of their use life due to separation rupture of the tread rubber layer at the initial use stage (hereinafter abbreviated as TLB), cut damage with the extremely poor appearance at the last life stage and the like, making recapping impossible.

Among the above problems, the conventional counter-measure for the improvement of cut resistance, i.e. a method of making the end count of cords in the belt small to lower the rigidity of the belt indeed provides an effect upon the initial cut resistance, but frequently causes cut damages in the rubber between the cords due to the smaller end count at the last life stage. Also, attempts have been made to use high elongation cords with a strand construction in the outermost belt layer. However, since the surface strain applied per one filament in such a cord during running on the bad road is too large, the separation failure is caused near the boundary between rubber and cord and particularly the TLB is induced at the last wear life stage. Even if the TLB is intended to be suppressed by decreasing the end count of the high elongation cords, the cut resistance is deteriorated at the last life stage likewise in the above case, so that it can not be used as a base tire for recapping.

SUMMARY OF THE INVENTION

An object of the invention is to provide an advantageous and appropriate solution on the above problems without causing the drawbacks of the prior art and to improve the resistance to TLB and cut resistance in the pneumatic radial tire as discussed above which is used on roads including at least a bad road.

According to the invention, there is the provision of a pneumatic radial tire having an improved durability in the running on bad roads, which comprises a carcass composed of at least one rubberized cord ply containing cords arranged substantially perpendicular to the equatorial plane of the tire, and a belt superimposed around the crown portion of the carcass and composed of at least two rubberized cord layers each containing cords inclined at a relatively small angle with respect to the equatorial plane of the tire, the cords of which being crossed with each other, wherein the outermost layer of said belt contains cords having a flexural rigidity lower than that of the remaining layer(s) and arranged at an end count higher than that thereof.

According to a preferred embodiment of the invention, the outermost layer of the belt contains steel cords each having a flexural rigidity $\epsilon k$ of 5–55 kg·mm² and a good rubber-penetrating layer or single strand construction, which are arranged at a high end count corresponding to a distance between cords of 0.2–0.8 mm.

DETAILED DESCRIPTION OF THE INVENTION

The rubberized cord layer containing cords with a relatively low flexural rigidity arranged at a high end count as the outermost layer of the belt serves to effectively prevent the tendency of producing TLB in the tread rubber over the total tire wear life during the running on bad road without degrading the cut resistance.

The flexural rigidity $\epsilon k$ of the cord is generally given by a ratio of variant of moment M to unit 1/R in which R is a radius of curvature, i.e. by the following equation:

$$\epsilon k = \frac{dM}{d(1/R)} = MR, \tag{1}$$

which is known to satisfy the following relation in accordance with the strength of materials:

$$MR = EI, \tag{2}$$

in which E is a Young's modulus and I is an inertia moment.

Further, the deformation behaviour of the cord under a load F concentrated in a middle point when supported by needles at both ends is given by the following equation:

$$\delta_{max} = \frac{Fl^3}{48EI}$$

in which l is a span between supports. In conclusion, $\epsilon k$ can be determined by the following equation:

$$\epsilon k = l^3/48 \cdot F/\delta_{max} \tag{3}$$

The stress-strain curve in the deformation of the cord is drawn using a three-point bending tester with a span of 50 mm, from an inclination $(F_2-F_1)/(\omega_2-\omega_1)$ of the linear portion of which is defined the flexural rigidity $\delta k$ of the steel cord by the following equation:

$$\epsilon k = 50^3/48 \times (F_2-F_1)/(\omega_2-\omega_1) \tag{4}$$

As a result of experiments on steel cords having different twisting constructions, it was found that the aforementioned object is advantageously achieved when the value of the flexural rigidity $\epsilon k$ as calculated by the equation (4) is as low as 5–55 kg·mm².

Also, the value $\epsilon k$ of the flexural rigidity of the steel cord used in the conventional rubberized cord layer for the belt is about 130 kg·mm².

It should be noted that the twisting construction of the steel cord used in the outermost layer of the belt is determined by considering the rubber penetration as in a single strand construction of $1 \times 5 \times 0.2$ mm or a layer construction of $(2+7) \times 0.23$ mm + $1 \times 0.15$ mm.

According to the invention, it is necessary to use a rubberized cord layer containing the above defined cords arranged at such a high end count that the distance between cords is within a range of 0.2–0.8 mm as an outermost layer of the belt. In the conventional belt, the distance between the cords is about 1.0 mm, which is fairly different from that of the invention.

Next, the improving effects on the resistance to TLB and the cut resistance according to the invention will be described below based on test results with respect to TBR tires each having a size of 10.00 R20 14PR and a lug type tread pattern.

In the tire to be tested, the carcass was composed of a single ply containing steel cords of $(3+9+15) \times 0.175$ mm $+ 1 \times 0.15$ mm arranged in the radial direction of the tire at an end count of 8 cords/25 mm, and the belt having an effective width of 160 mm was superimposed about the crown portion of the carcass and composed of four rubberized cord layers, wherein the first to third layers as viewed from the carcass contained steel cords of $3 \times 0.20$ mm $+ 9 \times 0.38$ mm, respectively, provided that the steel cords in the first layer were arranged at an end count of 9 cords/25 mm and at 50° upward to the right with respect to the equatorial plane, while the steel cords in the second and third layers were arranged at an end count of 14 cords/25 mm and at 20° upward to the right and to the left with respect to the equatorial plane respectively, and the fourth layer had various twisting constructions and distances between cords as shown in the following table in which the cords were arranged at 70° upward to the left with respect to the equatorial plane. In the table, Run Nos. 1 and 2 were the examples of the invention, Run Nos. 3–5 were comparative examples, and Run No. 6 was a control of the conventional tire.

The properties other than the resistance to heat build-up were measured by actually running the test tire over 20,000 km under 100% load on a general road including 40% of a bad road (gravel pavement). The resistance to heat build-up was evaluated by running a fresh test tire on a drum tester. The evaluation criterion on the respective property was as follows:

Cut resistance:

The tread rubber was peeled off from the tread at an examining region of 10 cm in width over the tread center and 30 cm in length along the tire equator to count the number of cut damages reaching the belt, which was converted into the number of cut damages over the entire circumference of the tire.

Resistance to TLB:

The area of TLB produced at the above examining region was measured.

Corrosion resistance:

Twenty cords were randomly taken out from the outermost belt layer at the examining region to visually observe the occurrence of rust in accordance with such a five-step evaluation that step A is substantially no rusting, step B slight rusting, step C medium degree of corrosion, step D much corrosion with partial breaking of filaments in the cord and step E conspicuous corrosion with cord breaking.

Wear resistance:

The running distance causing the reduction of 1 mm in groove depth was determined.

Resistance to heat build-up:

After the test tire subjected to an internal pressure of 7.25 kg/cm$^2$ was run on a test drum of 6 m in diameter at a circumferential speed of 60 km/h under a 100% load for 60 minutes, the temperature of the tire was measured in the tread portion at a depth of 15 mm from the tread surface.

An obvious from the above table, the great improvement on the cut resistance and the resistance to TLB have been attained according to the examples of the invention as compared with the control tire, while the cut resistance was undesirably deteriorated in the case of Run No. 3 of the comparative example because of the wider distance between cords, and both of the cut resistance and the resistance to TLB were reduced in the case of Run No. 4 because of too small flexural rigidity, and the cut resistance was also damaged in the case of Run No. 5 because of too high flexural rigidity.

According to the invention, the resistance to TLB can be considerably improved in addition to the improvement of the cut resistance, so that the re-use degree of the tire as a recapping tire after it is completely worn out can advantageously be enlarged even when the tire is run on bad roads.

|  | Example | | Comparative Example | | | Control |
|---|---|---|---|---|---|---|
| Run No. | No. 1 | No. 2 | No. 3 | No. 4 | No. 5 | No. 6 |
| Steel cord in the outermost layer | $1 \times 5 \times 0.20$ | $(2 + 7) \times 0.23 + 1 \times 0.15$ | $1 \times 5 \times 0.20$ | $1 \times 5 \times 0.15$ | $(2 + 7) \times 0.25 + 1 \times 0.15$ | $3 \times 7 \times 0.23$ |
| $\epsilon k$ (kg · mm$^2$) | 10 | 45 | 10 | 3 | 60 | 130 |
| Distance between cords (mm) | 0.4 | 0.6 | 0.9 | 0.4 | 0.6 | 1.2 |
| Cut resistance (Number of cuts/tire) | 118 (125) | 135 (110) | 164 (90) | 159 (93) | 163 (91) | 148 (100) |
| Resistance to TLB (cm$^2$/tire) | 35 (154) | 38 (142) | 52 (104) | 56 (96) | 53 (102) | 54 (100) |
| Corrosion resistance | A | A | A | B | B | B |
| Wear resistance (km/mm) | 1.238 (103) | 1.243 (103) | 1.231 (102) | 1.183 (98) | 1.195 (99) | 1.207 (100) |
| Resistance to heat build-up (°C.) | 98 | 97 | 99 | 98 | 98 | 99 |

The numerical value in the parenthesis for each property is indicated by an index on the basis that the control tire of Run No. 6 is 100. The larger the index value, the better the property.

What is claimed is:

1. A pneumatic radial tire having improved durability in the running on bad road, comprising; a carcass composed of at least one rubberized cord ply containing cords arranged substantially perpendicular to the equatorial plane of the tire, and a belt superimposed around the crown portion of the carcass and composed of at least two rubberized cord layers each containing cords inclined at a relatively small angle with respect to the equatorial plane of the tire, the cords of which being crossed with each other, wherein the outermost layer of said belt contains steel cords of a layer construction or single strand construction having good rubber penetration and a flexural rigidity lower than the cords of the remaining layer(s) and arranged at a higher end count than the cords of the remaining layer(s), said higher end count corresponding to a distance between cords of 0.2–0.8 mm.

2. A pneumatic radial tire according to claim 1 wherein said outermost layer of the belt contains steel cords each having a flexural rigidity $\epsilon k$ of 5–55 kg·mm$^2$ and a single strand construction of $1\times 5$.

3. A pneumatic radial tire according to claim 1, wherein said outermost layer of said belt contains steel cords having a flexural rigidity $\epsilon k$ of 5–55 kg·mm$^2$ and a layer construction of $2+7+1$.

* * * * *